United States Patent [19]
Schaufelberger et al.

[11] Patent Number: 5,255,194
[45] Date of Patent: Oct. 19, 1993

[54] SYSTEM FOR MAINTAINING A VEHICLE EQUIPPED WITH ABS IN DRIVING DIRECTION DURING LATERAL SKIDDING

[75] Inventors: Rolf Schaufelberger, Ditzingen; Herbert Demel, Möglingen; Elmar Müller, Markgröningen, all of Fed. Rep. of Germany

[73] Assignee: Robert Bosch GmbH, Stuttgart, Fed. Rep. of Germany

[21] Appl. No.: 785
[22] PCT Filed: Aug. 16, 1989
[86] PCT No.: PCT/EP89/00961
  § 371 Date: May 29, 1990
  § 102(e) Date: May 29, 1990
[87] PCT Pub. No.: WO90/02064
  PCT Pub. Date: Mar. 8, 1990

Related U.S. Application Data

[63] Continuation of Ser. No. 473,998, May 29, 1990, abandoned.

[30] Foreign Application Priority Data

Aug. 17, 1988 [DE] Fed. Rep. of Germany ....... 3827883

[51] Int. Cl.$^5$ .................................................. B60T 8/32
[52] U.S. Cl. ........................... 364/426.02; 303/95; 303/103; 303/105
[58] Field of Search ............ 303/96, 100, 105, 106, 303/111, 103; 364/426.01, 426.02, 426.03; 180/426.03, 197

[56] References Cited

U.S. PATENT DOCUMENTS

| | | | |
|---|---|---|---|
| 3,706,352 | 12/1972 | Ferguson et al. | 303/100 |
| 3,877,755 | 4/1975 | Carp et al. | 303/106 |
| 3,917,353 | 11/1975 | Swiden et al. | 303/106 |
| 4,032,197 | 6/1977 | Kohler | 303/96 |
| 4,060,285 | 11/1977 | Jones | 303/106 |
| 4,344,137 | 8/1982 | Skarvada | 364/426.02 |
| 4,349,876 | 9/1982 | Lindemann | 303/111 |
| 4,420,191 | 12/1983 | Arikawa et al. | 364/426.02 |
| 4,593,955 | 6/1986 | Leiber | 303/106 |
| 4,657,314 | 4/1987 | Leiber | 303/100 |
| 4,665,490 | 5/1982 | Masaki et al. | 364/426.02 |
| 4,671,579 | 6/1987 | Sawano et al. | 303/95 |
| 4,758,053 | 7/1988 | Yasuno | 303/91 |
| 4,809,183 | 2/1989 | Eckert | 364/426.04 |
| 4,852,009 | 7/1989 | Jonner et al. | 364/424.02 |
| 4,855,917 | 8/1989 | Sawano et al. | 364/424.02 |
| 4,881,785 | 11/1989 | Ushijima et al. | 303/111 |
| 4,898,431 | 2/1990 | Karnopp et al. | 303/100 |

FOREIGN PATENT DOCUMENTS 2011564  7/1979  United Kingdom .

Primary Examiner—Thomas G. Black
Assistant Examiner—Collin W. Park
Attorney, Agent, or Firm—Felfe & Lynch

[57] ABSTRACT

System for preventing skidding when the dynamic limits of driving are surpassed, e.g., when the vehicle skids laterally during excessive curve speed, by subjecting forceful braking at least to the front wheels, even to the point of locking. Several systems for detecting skidding which would effect such braking are possible.

20 Claims, 3 Drawing Sheets

SYSTEM FOR MAINTAINING A VEHICLE EQUIPPED WITH ABS IN DRIVING DIRECTION DURING LATERAL SKIDDING

This application is a continuation of application Ser. No. 07/473,998, filed May 29, 1990, now abandoned, which application was a PCT national phase application based on PCT International Application No. PCT/EP89/00961, file Aug. 16, 1989.

BACKGROUND OF THE INVENTION

When a vehicle, during braking without anti-lock control, starts skidding laterally with the wheels locked, the direction of movement of the gravity center which was present before the beginning of the skidding generally does not change since locked wheels cannot transfer lateral forces. A vehicle without ABS reacts in the same way when it starts skidding without braking because it has exceeded the dynamic limits of driving and the driver then applies the brakes during the skidding such that the wheels lock.

ABS prevents lateral skidding during braking as long as the dynamic limits of driving (e.g. excessive curve speed) are not surpassed. If the brakes are applied during skidding or if skidding occurs during a controlled braking, the wheels are able to further transmit lateral guidance because of the anti-lock control system. Unless the yaw angle speed or the angle of fishtailing of the vehicle are too great, the driver is able to keep the desired course depending on the handling properties of the vehicle. If the speed of the yaw angle or fishtailing angle exceed certain limits, even the well-trained driver is no longer able to control the skidding.

Because of the kinematics of skidding, the effective circumferential force of the wheels is also reduced with an increasing fishtailing. The ABS control, hence, assumes an apparent instability caused by a pressure surplus. The resulting pressure reduction causes the lateral guidance of the front axle to increase which, depending on the selected steering angle, results in an uncontrollable change of the driving direction. This further increases the skidding.

SUMMARY OF THE INVENTION

In order to avoid such a critical driving situation, an effective measure is a forceful braking, particularly locking, of the front wheels (brought into high slippage) after an unmistakable sensing of lateral skidding, which in turn maintains the vehicle in driving direction, i.e. maintains the direction of movement of the center of gravity of the vehicle. An additional support is changing the braking force at the rear wheels. A practical possibility is that the ABS acting on the rear wheels is at least partially shut down during skid detection. The following shows possibilities of how to sense lateral skidding. The obvious discrepancy during skidding between a high alleged vehicle deceleration and the pressure reduction time, which is high relative to the total time, can be used for sensing the skidding when an appropriate threshold value is selected.

A possible starting point is forming the quotient of the sum of the differences of reduction and build-up time at the front and rear axle, and the total time T of the current control procedure, as expressed in the following equation:

$$SLQ = \frac{(t_{red} - t_{bup})\text{front} + (t_{red} - t_{bup})\text{rear}}{T}$$

If SLQ reaches a prescribed threshold, this is used for detection of the skidding situation. Practical driving test showed that the difference of SLQ with respect to different roads is particularly clear, particularly on roads which permit a rapid build-up of lateral guidance and, hence, must be considered as being critical for skidding. This ensures an unmistakable sensing of the driving situation, particularly when the wheel curves characteristic for skidding are incorporated as a decisive criterion.

Another possibility of detecting lateral skidding is provided by the signals of analog acceleration sensors which describe the kinematic curve in both longitudinal and transverse direction of the vehicle. The analog signal as well as the differentiated form respective thereof can be used for sensing. Moreover, in connection with the following equation:

$$S_W = \left(\frac{a_q}{v_F^2}\right)\left|\Omega \cdot \frac{v_{Ft2}^2 a_{qt1} - v_{Ft1}^2 a_{qt2}}{a_{qt1} a_{qt2} (a_{qt2} - a_{qt1})}\right|$$

($a_q$: transverse acceleration; $v_F$: vehicle speed; $t_1$, $t_2$: control times( a skidding threshold is indicated when a prescribed threshold value S is exceeded ($|S_W| \geq S$).

Provided the signals of the steering angle $\delta$, $\dot{\delta}$ can be supplied, the functional relationship of the yaw angle $\beta(t, \delta, \dot{\delta})$ with $\delta$ and $\dot{\delta}$ can be used and the following equation $$A = \left[\frac{C_{SF} L_F}{\theta_Z} - \frac{C_{SF} C_{SR} (L_F L_R + L_R^2)}{\theta_Z m v_F^2}\right]\delta - \frac{C_{SF}}{m v_F}\dot{\delta}$$

can be used for sensing the skidding where $C_{SF/R}$: inclined position rigidity, $L_{F/R}$: length front/rear (=distance between gravity center and front wheel/rear wheel), $\theta_Z$: moment of inertia around vertical axis, m: vehicle mass. The individual possibilities of skid detection can be applied separately, but it is also possible to use two or more together.

DETAILED DESCRIPTION OF THE PREFERRED EMBODIMENTS

Figure 1:
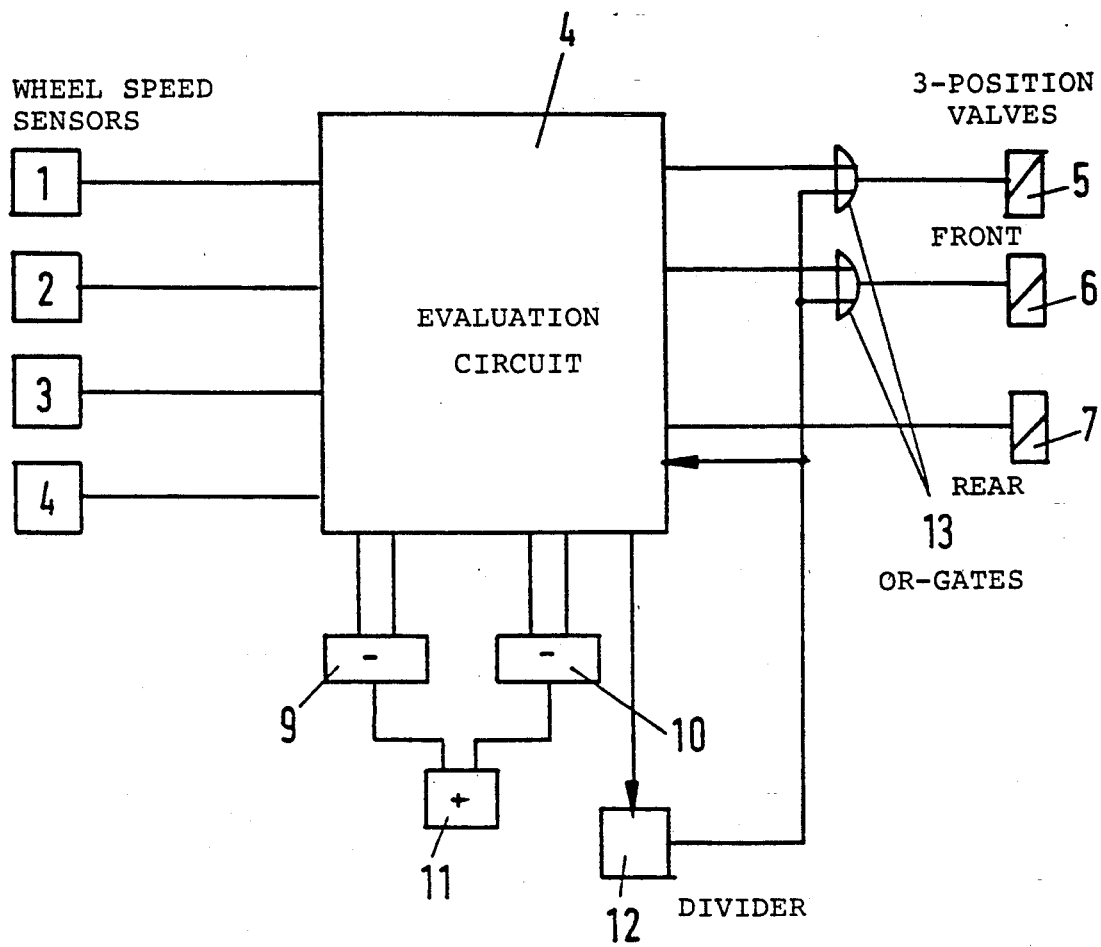
FIG. 1 depicts circuitry for detecting skidding by comparing a value calculated from the difference of pressure reduction and build-up at the front and rear axle with a threshold value.

In FIG. 1, the wheel speed sensors 1 to 4 that are associated with the wheels of a vehicle transit signals which characterize the wheel movement are. In an evaluation circuit 14, these signals are transformed into brake pressure control signals which serve to actuate three-position valves 5 and 6 associated with the front wheels and a common three-position valve 7 for the rear wheels. In the case of ABS, where the connection between main brake cylinder and wheel brake cylinder is interrupted (not represented), the values 5 to 7 in the initial position separate a pressure source from the wheel brake cylinder, in the second position they reestablish this connection allowing a pressure to build up, and in the third position they cause a pressure reduction at the wheel brakes. The duration of the actuation signals of the position two ($t_{bup}$) and three ($t_{red}$) of one of the valves 5 or 6 and of the valve 7 as well as the duration T of the entire control are measured in the evaluation circuit 14. The subtractors 9 and 10 form respective differences $(t_{red}-t_{bup})_{front}$ and $(t_{red}-t_{bup})_{rear}$, and these differences are added up in adder 11. In a divider 12, this sum is set into relation with time T. If the ratio exceeds a certain threshold, the divider 12 supplies an output signal which actuates the valves 5 and 6 via OR-gates 13 to build-up pressure and lock the wheels. In addition, the ABS control is shut down.

Figure 2:
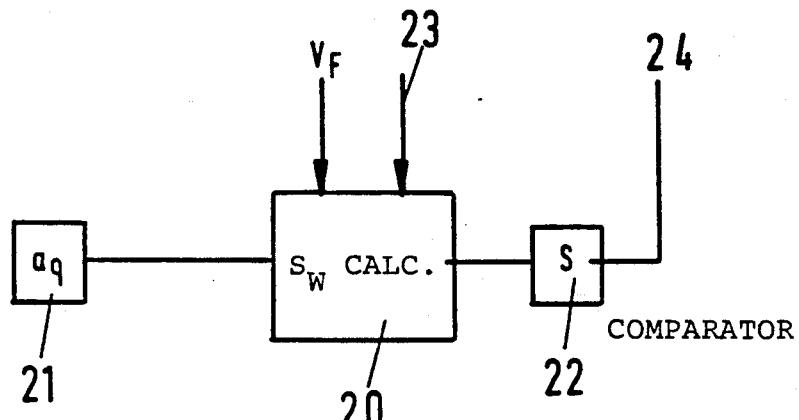
FIG. 2 depicts circuitry for detecting skidding by comparing a value calculated from the transverse acceleration with a threshold value.

In FIG. 2, the analog signal of a transverse acceleration sensor 21 is supplied to a block 20 and the vehicle speed $v_F$ is supplied from the evaluation circuit 4. Via a line 23, the block 20 receives in short intervals at times $t_1$ and $t_2$ a pulse signal and detects the values for $a_q$ and $v_F$ at times $t_1$ and $t_2$. The above indicated value skidding threshold value $S_w$ is calculated therefrom, and in a comparator 22, the absolute value thereof is compared to a prescribed threshold value. ($|S_w| \geq S$ threshold). If $|S_w|$ exceeds the prescribed threshold value S the locking signal for a pressure at the front wheel brakes is supplied via line 24.

Figure 3:
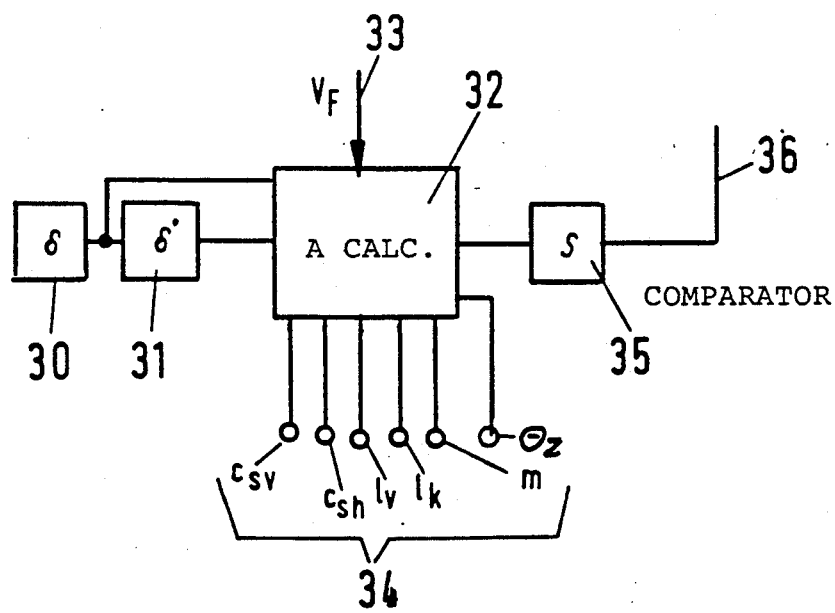
FIG. 3 depicts circuitry for detecting skidding by comparing a value calculated from the steering angle and its derivative with a threshold value.

In FIG. 3, the steering $\delta$ is measured analogously in a sensor 30 and the derivative $\dot{\delta}$ thereof is formed in a differentiator 31. In addition to these values, the vehicle speed $v_F$ from the evaluation circuit 14 is supplied via a line 33 and a number of constants are supplied via terminals 34 to a block 32 which forms the above indicated skidding threshold value A. If this value exceeds a prescribed threshold value S in a comparator 35, the latter generates a signal on a line 36 which again actuates a locking pressure at the front wheels, and possibly at the rear wheels.

Figure 4:
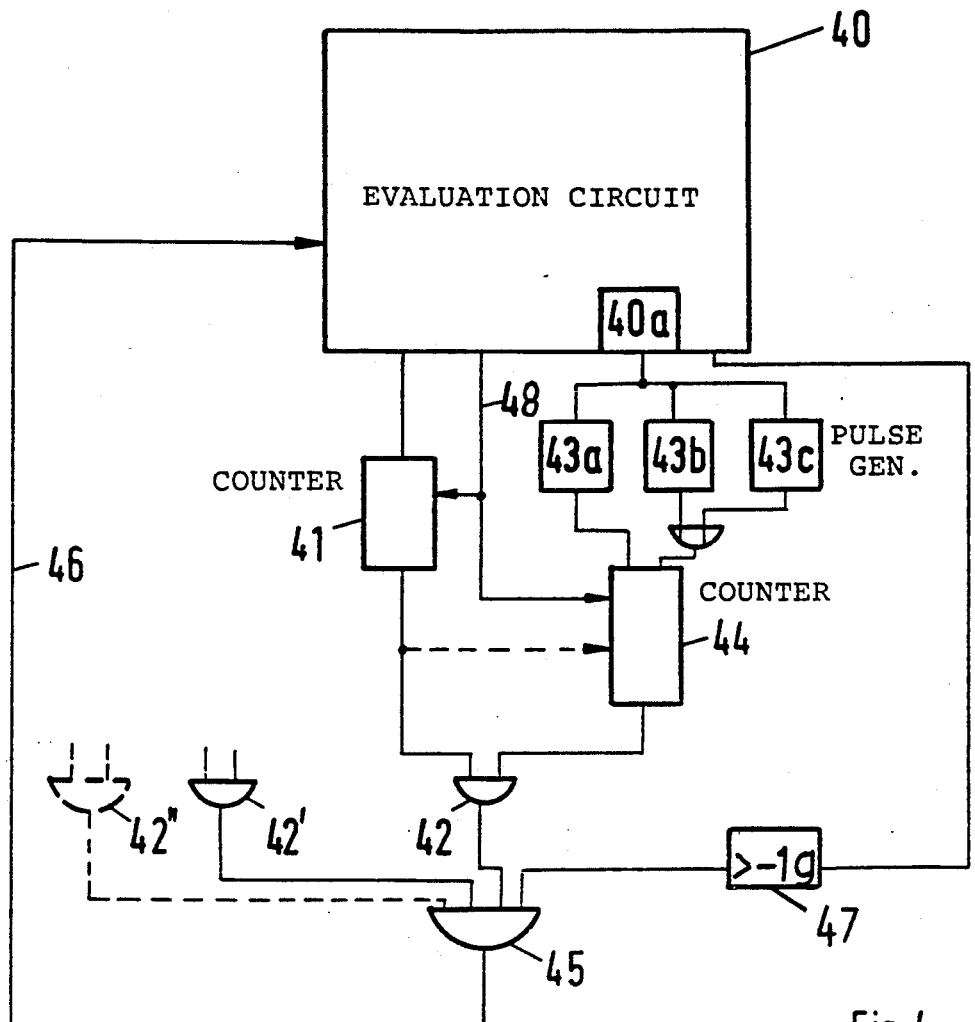
FIG. 4 depicts circuitry for detecting skidding by comparing pulses representing brake pressure reduction for a given range of wheel deceleration with a threshold value at each of two or three wheels.

FIG. 4 only represents the evaluation circuit 40 of the anti-lock control. When the evaluation circuit reduces pressures at a certain rear wheel during ABS operation, this circuit 40 supplies pulses to a counter 41 which adds up these pulses. Via a line 48, the counter 41 is controlled such that it can only add up pulses which occur between two pressure build-up phases. If the counter 41 reaches a prescribed threshold, it supplies a signal to an AND-gate 42. In a block 40a in the evaluation circuit, the appertaining wheel speed determined from the wheel deceleration is time-filtered. Three pulse generators 43a-43c are provided. The pulse generator 43a supplies pulses to a counter 44, when the wheel deceleration is between two limits, e.g. 0 and −2 g. This counter 44 adds up the pulses incrementally if it was actuated via line 48 (this is only the case when counter 41 is also active). The pulse generator 43b supplies pulses when the wheel deceleration is below the indicated range and the pulse generator 43c supplies pulses when the wheel deceleration is above the indicated range. These pulses of the pulse generators 43b and 43c reset the counter 44 decrementally. If counters does reach a prescribed threshold because of the adding up and despite the resetting between the pressure build-up phases, it supplies a signal to the AND-gate 42 which now, in turn supplies a signal to the AND-gate 45.

A detection circuit corresponding to blocks 40a–44 is associated to a second wheel and, if necessary, to a third wheel. These wheels can be two rear wheels, one front wheel and one rear wheel, or two rear wheels and one front wheel. If the results for the other rear wheel are the same as described above, an AND-gate 42' supplies a signal.

When the signals of the AND-gate 42 and 42' are supplies simultaneously, a signal is available at a line 46 indicating the detection of skidding and triggering a corresponding reaction in the evaluation circuit.

When three wheels are controlled, an AND-gate 42'' must also supply an output signal in order to generate a skidding detection signal at line 46. FIG. 4 shows the additional integration of a condition for skidding detection requiring that the vehicle deceleration, which is recovered from the wheel speeds, must fall below a threshold (e.g. −1 g) (block 47). Also integrated in FIG. 4 is the alternative that the counter 44 is activated only when the counter 41 exceeds a threshold. Here, AND-gates 42, 42' and 42'' can be omitted and the counters 41 and 44 can be directly connected to the AND-gate 45. In addition, the AND-gate 45 could be provided with an input to which a signal is supplied if, in case of a comparison, a prescribed difference between the vehicle deceleration (e.g. 2 g) and the filtered wheel deceleration is surpassed.

Figure 5:
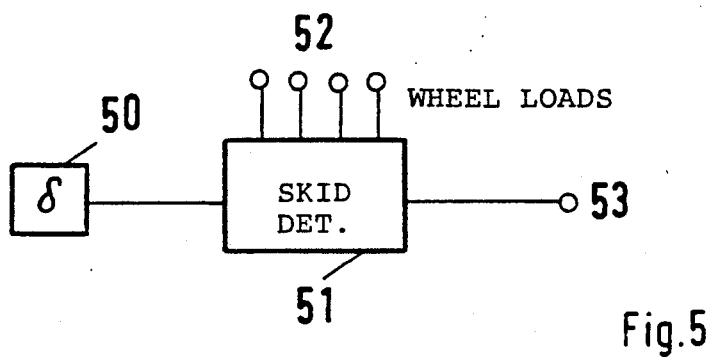
FIG. 5 depicts circuitry for detecting skidding when dynamic wheel loads at a given degree of locking are not plausible.

In FIG. 5, it is assumed that the steering angle $\delta$ (in 50) is measured and that wheel load signals (e.g. measured via stroke) are supplied via terminals 52 to a block 51. The latter supplies a skidding detection signal when the dynamic wheel load distribution is not plausible at a certain steering angle (e.g. turning toward the the left, the load is increased on the left side for this degree of locking). The signal which is then supplied at terminal 53 can indicate skidding either alone or together with other of the above signals. Block 51 can also supply a signal if it detects that the wheel loads are increased on one side exceeding at least a prescribed time.

The above described skidding detections can be used either individually or combined.

We claim:

1. System for maintaining direction of movement of the center of gravity of a vehicle equipped with front wheels and rear wheels and an antilock brake system which varies brake pressure at the wheels in dependency upon movement behavior of the wheels, said movement behavior including at least one of wheel speed, wheel deceleration, wheel acceleration, and slippage, said system comprising means for detecting lateral skidding of the vehicle, and means for shutting down the antilock braking system acting on the front wheels and automatically subjecting the front wheels to braking which is sufficiently forceful to cause slippage of the front wheel when lateral skidding of the vehicle has been detected.

2. System in accordance with claim 1 further comprising means for at least partially shutting down the antilock braking system acting on the rear wheels and automatically subjecting the rear wheels to braking which is sufficiently forceful to cause slippage of the rear wheels to maintain lateral skidding of the rear wheels when lateral skidding of the vehicle has been detected.

3. System in accordance with claim 1 wherein said means for detecting lateral skidding of the vehicle comprises:
   means for forming a difference between duration of pressure reduction and duration of pressure build-up at at least one front wheel during a total control time,
   means for forming a difference between duration of pressure reduction and duration of pressure build-up at at least one rear wheel during said total control time,
   means for forming a sum of said differences,
   means for dividing said sum by said total control time to form a quotient, and
   means for providing an output signal indicating lateral skidding when said quotient exceeds a prescribed threshold value.

4. System in accordance with claim 1 wherein said means for detecting lateral skidding comprises
   means for determining vehicle velocity $V_F$ at times $t_1$ and $t_2$,
   means for determining transverse vehicle acceleration $a_q$ at times $t_1$ and $t_2$,
   means for forming a lateral skidding value $S_w$ and $a_q$ and $V_f$ at times $t_1$ and $t_2$ and forming an absolute value $|S_w|$, and
   means for providing an output signal indicating lateral skidding when said absolute value $|S_w|$ exceeds a prescribed threshold value S.

5. System in accordance with claim 4 wherein said lateral skidding value $S_w$ is determined according to the equation $$S_w = \left(\frac{a_q}{(v_F)^2}\right) \left| t2 \frac{v_{F t 2}^2 a_{qt1} - v_{F t 1}^2 a_{qt2}}{a_{qt1} a_{qt2} (a_{qt2} - a_{qt1})} \right.$$

6. System as in claim 1 wherein said means for detecting lateral skidding comprises
   means for determining front and rear inclined position rigidities $C_{SF}$ and $C_{SR}$;
   means for determining distances $L_F$ and $L_R$ from gravity center to front and rear wheels;
   means for determining the movement of inertia $\Theta_z$ of the vehicle around a vertical axis;
   means for determining the steering angle $\delta$ and its derivative $\dot{\delta}$; and
   means for detecting skidding A according to the equation $$A = \left[ \frac{C_{SF} L_F}{\theta_Z} - \frac{C_{SF} C_{SR} (L_F L_R + L_R^2)}{\theta_Z m v_F^2} \right] \delta - \frac{C_{SF}}{m v_F} \dot{\delta}.$$

7. System as in claim 1 comprising
   means for reducing the the brake pressure in increments between between two pressure build-ups,
   means for determining the pressure reduction time,
   means for adding the pressure reduction increments to form a sum when the wheel deceleration is between two limits,
   means for subtracting the increment from said sum when the wheel deceleration is outside said limits, and
   means for indicating skidding when said pressure reduction time and said sum exceed prescribed thresholds at at least two wheels.

8. System as in claim 7 wherein said at least two wheels are the rear wheels.

9. System as in claim 7 wherein said at least two wheels are a front wheel and a rear wheel.

10. System as in claim 9 wherein said at least two wheels are a front wheel and both rear wheels.

11. System as in claim 7 wherein said means for adding and subtracting increments are operative only after a prescribed pressure reduction threshold has been reached.

12. System as in claim 7 wherein sad means for adding and means for subtracting comprise counters.

13. System as in claim 7 further comprising means for time filtering said wheel deceleration signals.

14. System as in claim 7 further comprising means for determining a vehicle deceleration from said wheel speeds, said skidding indication further depending on said vehicle deceleration.

15. System as in claim 14 further comprising means for determining when said vehicle deceleration falls below a prescribed threshold, skidding being indicated only when said vehicle deceleration falls below said prescribed threshold.

16. System as in claim 15 further comprising
   means for filtering said wheel deceleration signals, and
   means for subtracting the vehicle deceleration from the filtered wheel deceleration signals to form a difference, skidding being indicated only when said difference exceeds a prescribed threshold.

17. System as in claim 15 wherein lateral skidding is indicated when the vehicle deceleration determined from the wheel speeds fall below $-1$ g.

18. System as in claim 1 further comprising means for determining when wheel loads on one side of the vehicle are increased, skidding being indicated when said wheel loads are increased on one side exceeding a prescribed time.

19. System as in claim 1 further comprising means for determining when wheel loads on one side of the vehicle one increased, and means for determining the steering angle $\delta$, skidding being indicated when said load on one side exceeds a plausibility limit which varies with said steering angle.

20. System as in claim 1 wherein said front wheels are locked when lateral skidding is detected.

* * * * *

UNITED STATES PATENT AND TRADEMARK OFFICE
CERTIFICATE OF CORRECTION

PATENT NO. : 5,255,194
DATED      : Oct. 19, 1993
INVENTOR(S): R. Schaufelberger, et al.

It is certified that error appears in the above-indentified patent and that said Letters Patent is hereby corrected as shown below:

| | |
|---|---|
| Column 3, line 5 | Change "transit" to --transmit-- |
| Column 3, line 13 | Change "values" to --valves-- |
| Column 3, line 39 | Before "lock-", insert --signal for a-- |
| Column 3, line 40 | Delete "signal for a" |
| Column 4, line 6 | Change "counters" to --counter 44-- |
| Column 4, line 19 | Change "supplies" to --supplied-- |
| Column 4, line 66 | Change "wheel " to --wheels |

Signed and Sealed this

Fifth Day of September, 1995

Attest:

BRUCE LEHMAN

Attesting Officer

Commissioner of Patents and Trademarks